Patented Oct. 10, 1922.

1,431,863

UNITED STATES PATENT OFFICE.

JEAN ALTWEGG, OF LYON, FRANCE, ASSIGNOR TO SOCIETE CHIMIQUE DES USINES DU RHONE, OF PARIS, FRANCE.

PROCESS FOR OBTAINING CALCIUM SALT OF ACETYL SALICYLIC ACID.

No Drawing.    Application filed January 11, 1922.   Serial No. 528,468.

*To all whom it may concern:*

Be it known that I, JEAN ALTWEGG, residing at Lyon, France, a citizen of the Confederation of Switzerland, have invented certain new and useful Improvements in Processes for Obtaining Calcium Salt of Acetyl Salicylic Acid, of which the following is a specification.

It is known that the calcium salt of acetyl salicylic acid cannot be prepared by simple neutralization of the acid with calcium hydroxide in the presence of water; in this case an extensive saponification of the acetyl salicylic acid into salicylic acid and acetic acid would be observed.

The surprising observation has now been made that an addition of sodium chloride hinders this detrimental saponification. Hence acetyl salicylic acid is neutralized without difficulty by milk of lime, if the former is suspended in a 20 per cent solution of common salt. Whilst addition of ferric chloride to a 1 per cent solution of acetyl salicylate of calcium in pure water causes the latter to assume after a little time a slight, and after 24 hours, an intensive, violet colouring which points to the formation of free salicylic acid, this reaction does not occur, even after several days duration, if the calcium salt is dissolved in a 25 per cent sodium chloride solution.

It is now further found that the acetyl salicylate of calcium is much less soluble in a solution of common salt than in pure water; the following table makes this clearer:—

At 15° there are dissolved in—

100 cc. pure water, some 15 gr. acetyl salicylate of calcium.
100 cc. 10% common salt solution some 9 gr. salicylate of calcium.
100 cc. 20% common salt solution some 5 gr. salicylate of calcium.
100 cc. 30% common salt solution some 2 gr. salicylate of calcium.

Supported by these two observations the present process was worked out. It is advantageously distinguished from the known processes, because it permits the immediate neutralization of the acetyl salicylic acid by means of calcium hydroxide without organic solvent, and because it separates calcium salt as a difficultly soluble deposit which separates easily by filtering. A concentration of the reaction mixture which decomposes the calcium salt, even when it is undertaken in vacuum, is thus entirely avoided.

Example: 18 kg. acetyl salicylic acid are suspended in 35 litres of 25 per cent common salt solution, and there is added under good stirring at 15° C. a milk of lime produced from 2.8 kg. burned marble (Gebranntem Marmor) and 25 litres of 25 per cent common salt solution. The separated calcium salt is, so far as possible, separated from the liquid part by filtration and thorough exhaustion of the liquid, and some adhering mother-lye is removed with a little water. The salt obtained after drying is clearly soluble in water; the fresh solution is almost tasteless and gives no violet colouring with ferric chloride.

What I claim and desire to secure by Letters Patent is:—

Process for the preparation of the calcium salt of acetyl salicylic acid characterized in that acetyl salicylic acid is neutralized with the calculated amount of calcium hydroxide in the presence of common salt solution.

In testimony whereof I have signed my name to this specification.

JEAN ALTWEGG.

Witness:
JULIAN SEMBLE FINELBEY.